United States Patent [19]

Anderson

[11] 4,289,078
[45] Sep. 15, 1981

[54] TILTING DUMPING BOTTOM SECTION RAILWAY CAR

[75] Inventor: Robert S. Anderson, Huntington, W. Va.

[73] Assignee: ACF Industries, Inc., New York, N.Y.

[21] Appl. No.: 12,993

[22] Filed: Feb. 21, 1979

Related U.S. Application Data

[62] Division of Ser. No. 832,926, Sep. 13, 1977, Pat. No. 4,168,929.

[51] Int. Cl.³ .................. B61D 7/12; B61D 7/32; B61D 9/08; B61D 9/14
[52] U.S. Cl. .................. 105/241.2; 105/258; 105/262, 298/8 R; 414/387
[58] Field of Search .................. 105/241.1, 241.2, 258, 105/260, 262, 263, 261 R, 261 A; 414/378, 379, 383, 384, 387, 388; 206/519; 298/8 R, 8 H

[56] References Cited

U.S. PATENT DOCUMENTS

| | | | |
|---|---|---|---|
| 402,174 | 4/1889 | Mackall | 298/8 H |
| 483,200 | 9/1892 | Anderson | 105/262 |
| 1,001,334 | 8/1911 | Baisden, Jr. | 105/262 |
| 1,311,140 | 7/1949 | Tait | 105/262 |
| 1,825,943 | 10/1931 | Evans | 105/262 |
| 1,888,135 | 11/1932 | McCallen | 105/262 |
| 2,042,266 | 5/1936 | McCallen | 105/258 X |
| 2,906,213 | 10/1959 | Bonanno | 298/8 R |
| 3,211,305 | 10/1965 | Davenport et al. | 105/260 X |
| 3,245,358 | 4/1966 | Schieler | 298/8 H |
| 3,331,517 | 7/1967 | Webster | 105/262 X |
| 3,487,963 | 1/1970 | Thornander | 414/387 |
| 3,529,734 | 9/1970 | Marais | 105/241.1 X |
| 3,529,743 | 9/1970 | Ehrbar et al. | 206/519 X |
| 3,790,008 | 2/1974 | Joubert | 105/241.2 X |
| 3,896,945 | 7/1975 | Bjorklund et al. | 105/241.2 X |

Primary Examiner—David M. Mitchell
Assistant Examiner—Howard Beltran
Attorney, Agent, or Firm—Henry W. Cummings

[57] ABSTRACT

In accordance with the present invention an open top railway car is provided in which the car body is divided longitudinally into at least two body sections having opposite ends which are pivotally mounted on vertically extending supports attached to a car underframe. The body sections include respective transversely spaced side walls, at least one end wall, and bottom walls having inner edges which abut and/or overlap in closed position to define the bottom of the car. To achieve increased volumetric carrying capacity, the bottoms are horizontal and extend outboard of the wheels. Each of the body sections is pivotable from the closed position to an open position in which the inner edges of the bottom walls are spaced apart to allow discharge of lading between the rails. An energy saving unloading system is also disclosed for unloading the cars.

15 Claims, 14 Drawing Figures

TILTING DUMPING BOTTOM SECTION RAILWAY CAR

This application is a division of Ser. No. 832,926, filed Sept. 17, 1977, now U.S. Pat. No. 4,168,929 issued Sept. 25, 1979.

BACKGROUND OF THE INVENTION

This invention relates to open top, bottom dump railway cars for use in transporting lading such as coal and ore in bulk. While the car is particularly adapted for mine service, it also may be utilized in general rail service.

In U.S. Pat. Nos. 3,211,305 and 3,487,963 bottom dump cars are disclosed in which the bottom is hingedly connected to the car side along one edge of the side. During dumping the car body is supported allowing the non-hinged portion of the bottom to open for lading discharge.

In U.S. Pat. No. 3,529,734 an inclined bottom car is provided in which the car body is hingedly mounted on a first side of the car. The opposite side of the car is lifted to discharge lading below the side of the car being lifted.

In U.S. Pat. No. 3,331,517 a bottom dump car has a front portion including a bottom inclined toward the center of the car. The rear portion of the car is hingedly mounted on the front portion. The rear portion has a curved bottom which is raised relative to the front portion to discharge lading between the wheels of the car.

In U.S. Pat. No. 3,790,008 the bottom of the car is composed of clam-shell doors which are pivotally mounted about opposite ends of the car body. During unloading the clam-shell doors pivot in opposite directions to allow lading discharge between the wheels. However this arrangement does not make efficient use of the volume available for carrying lading. To discharge between the rails, the side walls are inclined inwardly, resulting in lost capacity in the car below the inclined side walls. If the sides are vertical, the transverse distance between the sides must be less than the distance between the rails, to obtain lading discharge between the rails. This also limits the carrying capacity of the car.

In U.S. Pat. No. 1,825,943 a mine car is disclosed in which transversely spaced body sections which abut and overlap in the mid portion of the car are pivotably mounted about longitudinally spaced end members. The lading is unloaded between the rails when the body sections are pivoted about the end members to the open position. However in this construction the body sections each include diagonal plates 29 and 30, extending longitudinally and transversely of each body section. The car volume beneath these diagonal plates carries no lading. Thus the carrying capacity of the car is reduced by the car volume under these diagonal plates.

In U.S. Pat. No. 2,042,266 transversely spaced side sections which extend outboard of the rails are pivotably mounted about longitudinally spaced end sections. In addition a longitudinally extending underframe includes a bottom which is pivotably mounted about one end of the car and latched to the other end of the car. To discharge lading the side sections are pivoted about the end sections to discharge lading outside the rails and the bottom is unlatched to discharge lading between the rails.

This design requires pivoting and latching structure for the bottom which increases the cost of the car.

SUMMARY OF THE INVENTION

In accordance with the present invention an open top railway car is provided in which the car body is divided longitudinally into at least two transversely spaced body sections having opposite ends which are pivotally mounted on longitudinally spaced, vertically extending supports attached to a car underframe. The body sections include respective transversely spaced side walls, at least one end wall and horizontal bottom walls having inner edges which abut and/or overlap in closed position to define the bottom of the car. Each of the body sections is pivotable from the closed position to an open position in which the inner edges of the bottom walls are spaced apart to allow discharge of lading between the wheels. To achieve increased volumetric carrying capacity, the bottoms are horizontal and extend outboard of the wheels. The body sections may be moved to the open position by activating devices including transversely spaced dump ramps located along the track or by fluid operated cylinders and pistons which also may guide the body sections into the closed position. The underframe for the car includes a pair of longitudinally extending, transversely spaced sills. The longitudinal sills may be located inboard or outboard of the wheels. The longitudinal sills join end sills located at opposite ends of the car. Two or more longitudinally spaced lading compartments may be provided in the car, each composed of a pair of transversely spaced body sections. Between each lading compartment a vertical support attached to the underframe is provided for pivotally mounting the adjacent ends of the body section located in adjacent compartments. The car may be used in rail service or in mine service. Through axles or stub axles may be used. If desired the car body may be supported by conventional four (4) wheel trucks.

DESCRIPTION OF PREFERRED EMBODIMENTS

Figure 1:
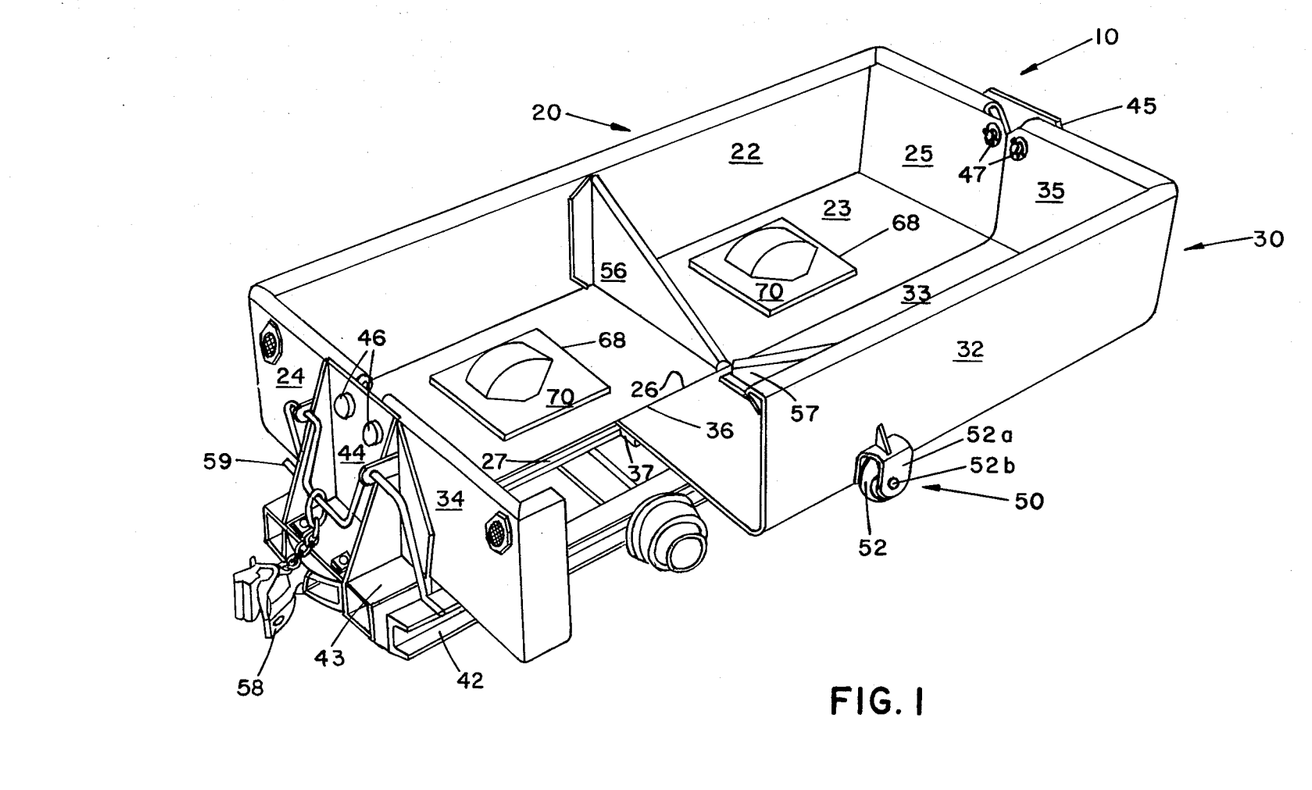
FIG. 1 is a perspective view of the open top, bottom dump car of the present invention illustrating the bottom of the car in closed position with a portion of the bottom removed.
Figure 2:
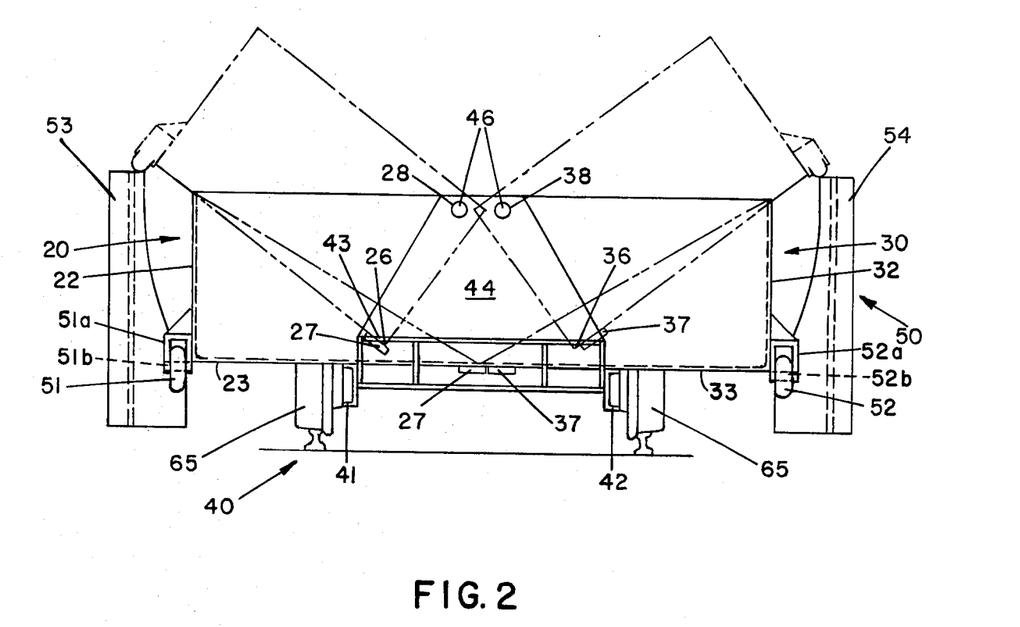
FIG. 2 is an end view of the car illustrated in FIG. 1 with the coupler and draft gear removed for clarity.
Figure 2A:
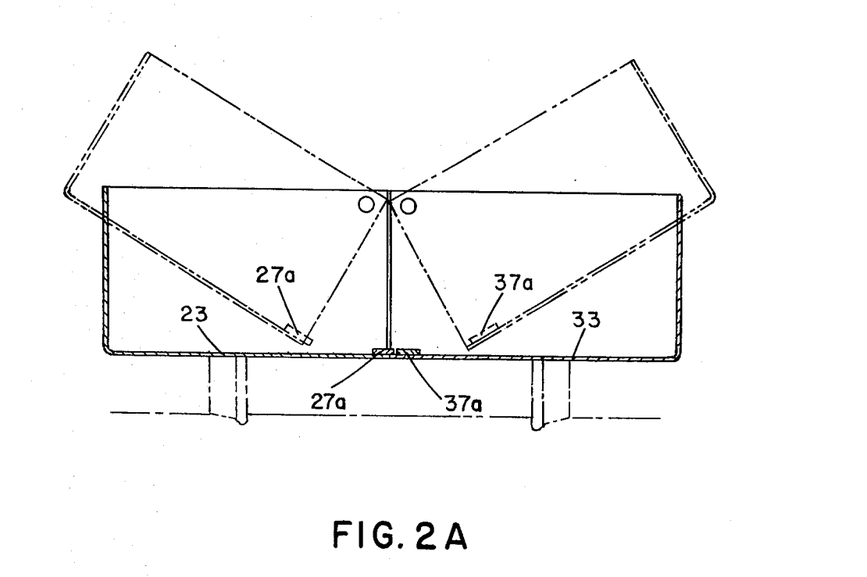
FIG. 2A is a transverse sectional view illustrating mounting longitudinal stiffeners inside the car.

The open top, bottom dump railway car of the present invention is indicated in the drawing generally at 10. The car includes transversely spaced body sections 20 and 30. The body sections include respectively side walls 22 and 32 rigidly attached to horizontal bottom walls 23 and 33. The side walls are also rigidly attached respectively to end walls 24 and 25 and 34 and 35. The inner ends of respective bottom walls 23 and 33 have edges 26 and 36 which abut along a longitudinal line of the midportion of the car. Longitudinally extending stiffeners 27 and 37 are provided which abut as shown in FIGS. 1 and 2. As shown in FIG. 2A stiffeners 27a and 37a may be mounted on the inside surface of bottom walls 23 and 33. In addition to longitudinal stiffening, stiffeners 27, 37 and 27a, 37a provide additional sealing when the body sections 20 and 30 are in closed position.

An underframe indicated generally at 40 includes transversely spaced side sills 41 and 42 and end sills 43 and 43a (FIG. 3) which connect the side sills 41 and 42 at opposite ends of the car. Vertical supports 44 and 45 are rigidly attached to respective end sills 43 and 43a at opposite ends of the car. Pivot pins 46 and 47 are respectively attached to vertical supports 44 and 45. Each of the body sections 20 and 30 is provided with openings 28 and 38 respectively in the body section end walls 24, 25, 34 and 35 through which pins 46 and 47 pass to support body sections 20 and 30 for pivotal movement between closed (FIG. 1) and open position, shown in phantom in FIG. 2.

Actuating means indicated generally at 50 in FIGS. 1 and 2 comprising wheels 51 and 52 are mounted on opposite side walls 22 and 32. The wheels are mounted on respective U shaped brackets 51a, 52a about pins 51b, 52b. Ramps 53 and 54 mounted on opposite sides of the track upon which wheels 51 and 52 ride are provided to move the body sections 20 and 30 from the closed position shown in FIG. 1 to the open position shown in FIG. 2. It will be apparent that in the position shown in FIG. 2 the lading is discharge through the openings defined by the space between bottom wall inner edges 26 and 36. Optional transverse partitions 56 and 57 may be attached respectively to each body section 20 and 30 to reinforce the same at about the mid portion of the car. A conventional coupler 58 having a conventional uncoupling device 59 and a conventional draft gear (not shown) are provided at opposite ends of the car.

Transversely extending axles 61 and 62 (FIG. 3) are provided in the car each having axle bearings 63 and 64 mounting the axles and wheels 65 for rotational movement relative to side sills 41 and 42. An optional axle housing 66 may also be provided over each axle to prevent lading from damaging the axles during unloading.

Figure 3:
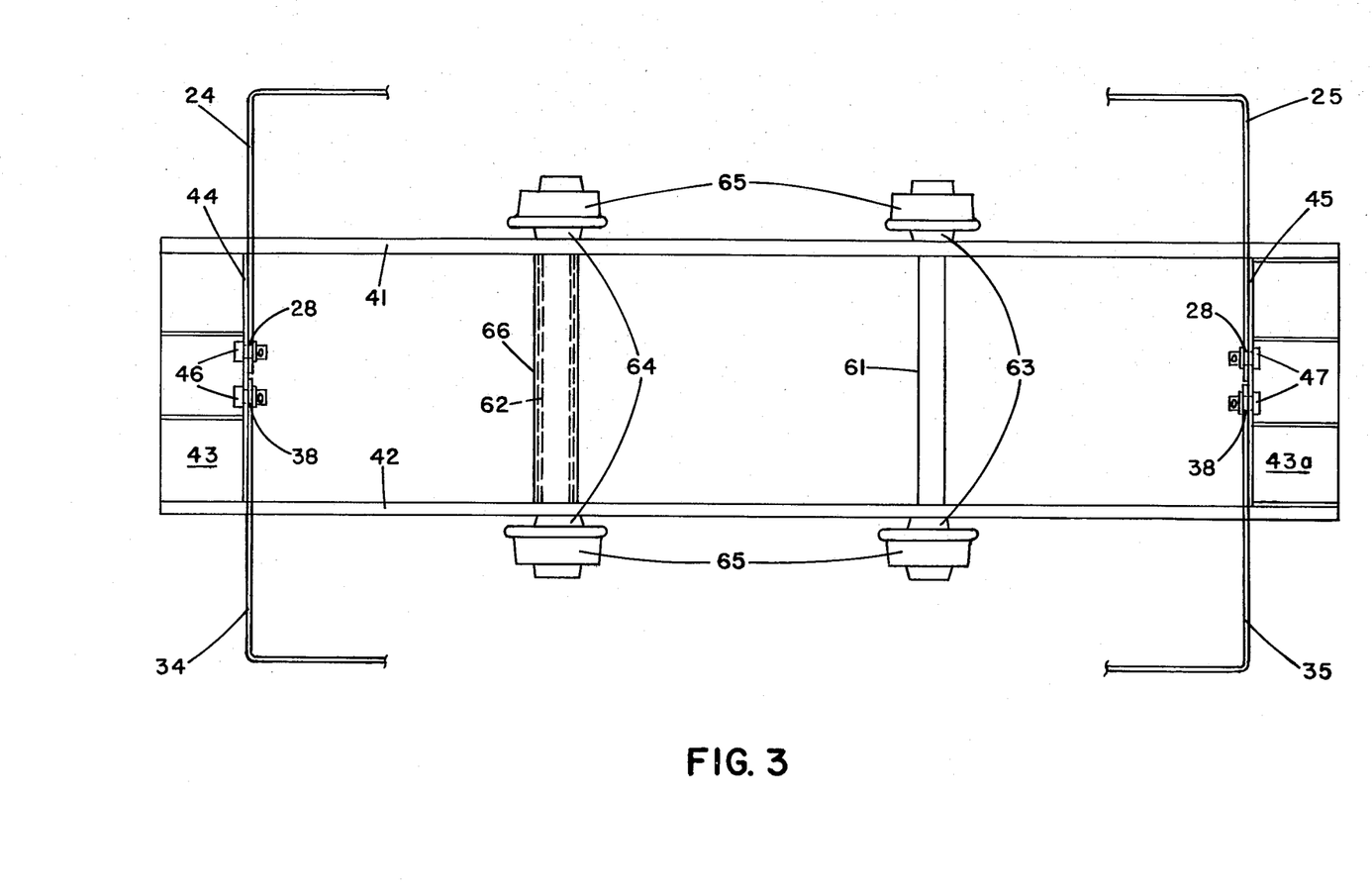
FIG. 3 is a top view of the car shown in FIG. 1 with the body sections partially removed illustrating a through axle design.

To enable the bottom to be located as near the ground as possible to maximize car volume, bottom walls 23 and 33 preferably include openings 68 for the wheels to pass through and formed plates 70 contoured to cover the wheels are welded to bottom walls 23 and 33.

Figure 4:
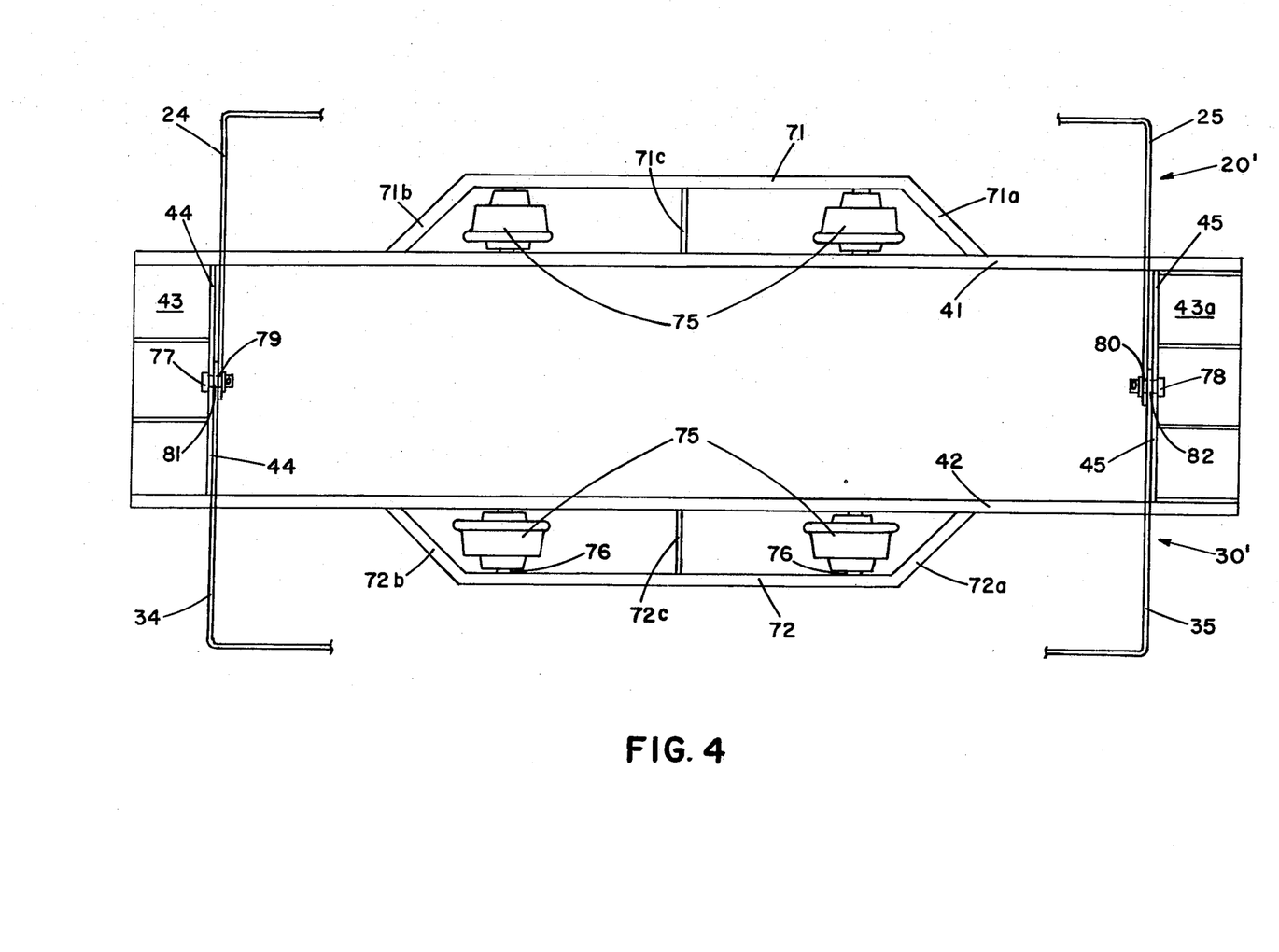
FIG. 4 is a top view similar to FIG. 3 but illustrating a stub axle design and also illustrating a single pin mounting arrangement for the respective body sections of the car.

A stub axle design may also be provided as indicated in FIG. 4. Longitudinal beams 71 and 72 are provided on opposite sides of the car having inclined portions 71a, 71b and 72a, 72b attached respectively to side sills 41 and 42. Wheels 75 are mounted between the side sills and longitudinal beams in a conventional manner utilizing stub axles 76. The stub axle design by eliminating the transverse axles is suited to unloading large lading chunks.

FIG. 4 illustrates an alternative arrangement for mounting body sections 20 and 30 wherein single pins 77 and 78 are mounted on respective vertical supports 44 and 45 and respective end body sections 24, 25 and 34, 35 are mounted upon the vertical supports 44 and 45 in an overlapping manner by openings 79 and 80 provided in end body sections 24 and 25; and openings 81 and 82 provided in end body sections 34 and 35. In this arrangement body section 30' is slightly longer than body section 29 and body section 20' telescopes slightly within body section 30' in the closed position.

It will be noted in FIG. 2 that body sections 20 and 30 extend considerably outboard of wheels 65, and horizontal members 23 and 33 make at least a 90° angle with side members 22 and 32. Thus the full available volume is used for carrying lading and the carrying capacity of this car includes not only volume located between the wheels but also a considerable volume located outboard of the wheels. Since the entire body sections are pivotable about end supports 44 and 45 the bottom portion located outboard of the wheels may extend down just as far as the bottom portion inboard of the wheels. This represents a considerable improvement in the carrying capacity of the car over that obtainable in U.S. Pat. Nos. 3,790,008 and 1,825,943 described above.

The following advantages of this car are also apparent. Cars can be dumped without stopping and the doors closed automatically; for example, utilizing the dump wheels 51 and 52 and the dump ramps 53 and 54. The pins 46, 47 or 77 and 78 can be located sufficiently high on support members 44 and 45 whereby the body sections can be moved upwardly sufficient that the bottom walls 23 and 33 have a sufficient inclination to exceed the angle of repose of any lading. Thus the angle of repose of the lading is not a limitation on the car of this invention.

Furthermore the design leaves no significant pockets or projections for lading to be trapped and thereby making unloading difficult and/or time consuming.

This car is easy to maintain. The car has few moving parts (only body sections 20 and 30). The body sections 20 and 30 can be easily removed from the underframe for repair or replacement and the body sections can be raised easily for inspection and lubrication and replacement of wheels and axles.

From a safety standpoint cars cannot be dumped accidentally as is the case with drop bottom cars with latches which may be inadvertently tripped in transit.

The car bottom extending outboard of the wheels and the horizontal bottom results in a car having a low center of gravity; thus the car tends to remain on the rails. Furthermore, during usual unloading procedure both sides of the car are lifted simultaneously. There is no unbalance during unloading, which occurs, for example, when one side or end of the car is lifted relative to the other portions of the car. There is little tendency for the car to turn over, in constrast to dumping arrangements such as shown in U.S. Pat. Nos. 3,331,517; 3,529,734; 3,487,963; and 3,211,305 discussed above in which one portion of the car is lifted relative to another portion, leaving a somewhat unstable structure during dumping.

Figure 5:
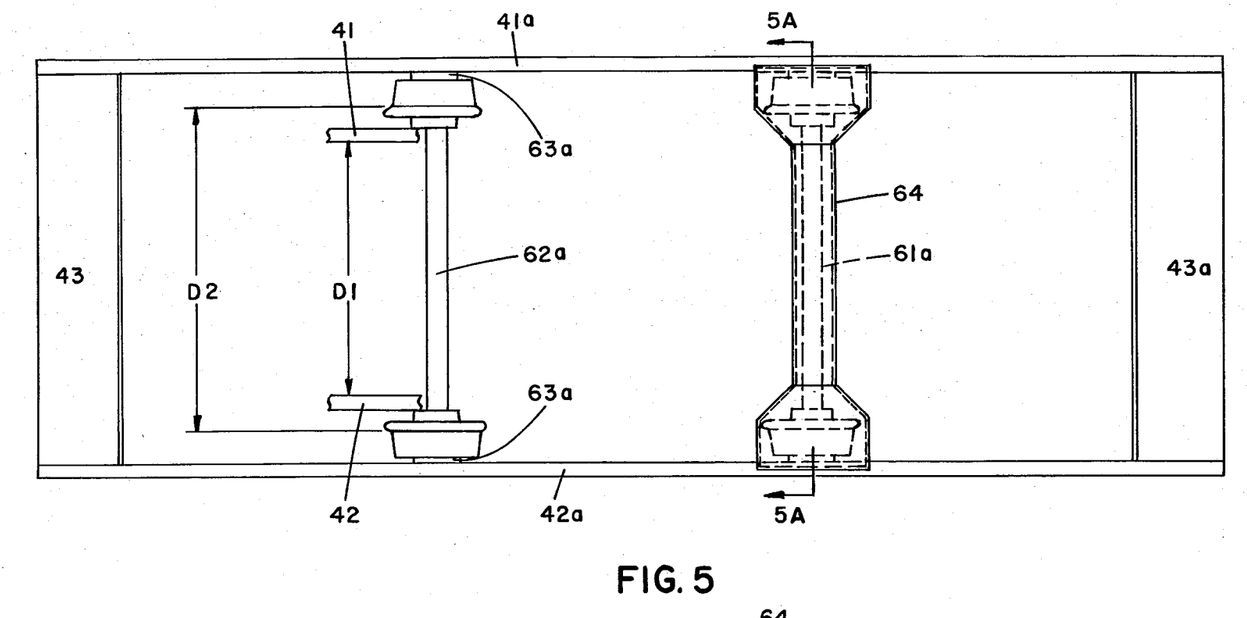
FIG. 5 is a view similar to FIG. 3 illustrating mounting the side sills outboard of the wheels.
Figure 5A:
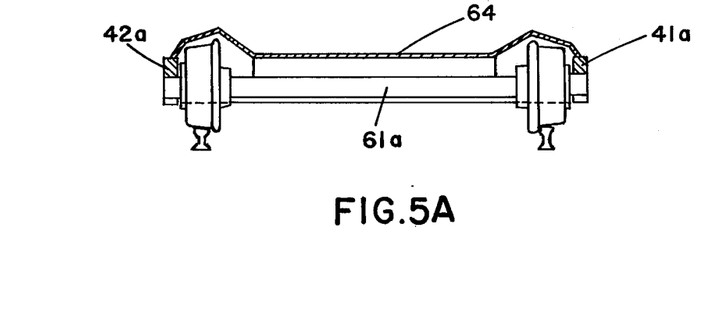
FIG. 5A is a sectional view along the lines 5A—5A in FIG. 5.

In another embodiment of the invention shown in FIGS. 5 and 5A, the sills 41a and 42a are mounted outboard of the wheels 65. Axles 61a and 62a extend between the wheels. Bearings 63a are journaled in sills 41a and 42a. With the sills located outboard of the wheels the maximum transverse opening distance is greater. Transversely extending covers 64 cover the wheels and axles. The greater opening is particularly advantageous in unloading lading made up of larger chuncks having a maximum diameter equal to the distance between rails. Compare $D_1$ with sills inboard with $D_2$ to wheels with sills outboard.

Figure 6:
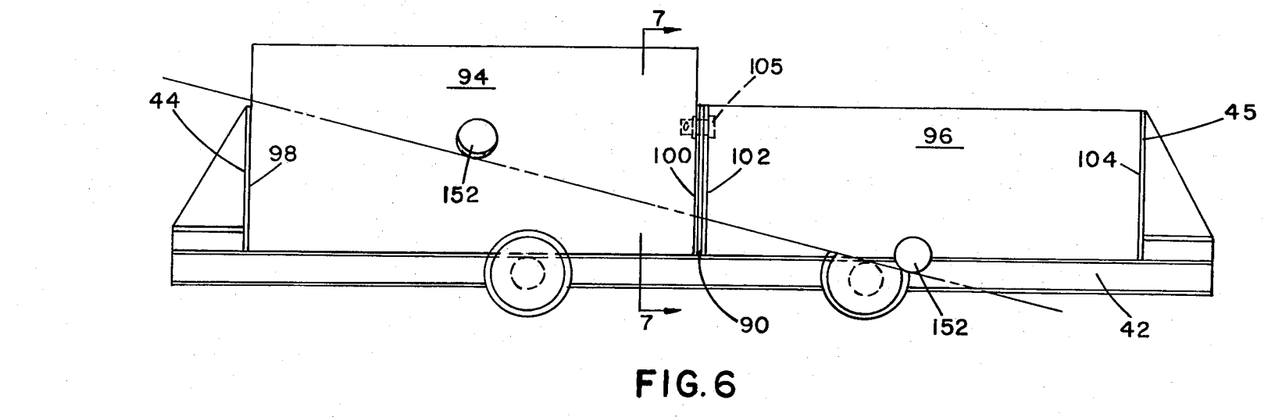
FIG. 6 is a side elevation view of an alternative embodiment of the present invention illustrating longitudinally spaced car compartments.
Figure 7:
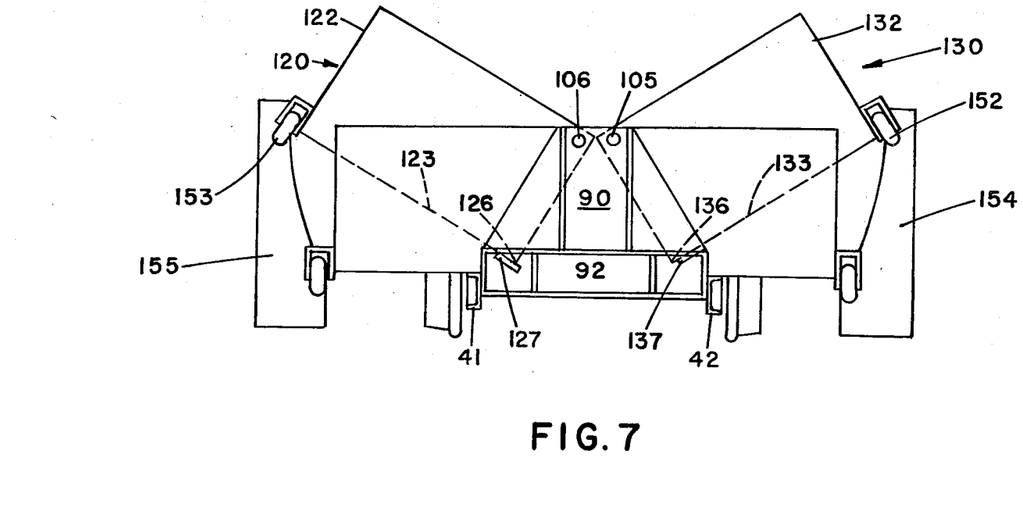
FIG. 7 is a view looking in the direction of the arrows along the line 7—7 in FIG. 6.

In FIGS. 6 and 7 another alternative is illustrated. In this arrangement an additional vertical support 90 is mounted on the underframe mid way between supports 44 and 45 by means of a plate 92 rigidly attached as by welding to side sills 41 and 42. A pair of longitudinally spaced compartments 94 and 96 are thus provided, each having end portions 98, 100; and 102, 104. Adjacent end portions of respective compartments 94 and 96 are attached to support plate 90 with rigid pins 105 and 106 extending into each compartment. Each of the compartments 94 and 96 is constructed in the same manner as illustrated in FIGS. 1 to 3, each including transversely spaced body sections 120 and 130 (FIG. 7) having respective side walls 122 and 132 and respective horizontal bottom walls 123 and 133. Bottom walls 123 and 133 have respective inner edges 126 and 136 and longitudinal stiffeners 127, 137. When body sections 120 and 130 of compartment 94 and/or 96 are pivoted about the pins at the end portions thereof the body sections assume the position shown in dotted lines in FIG. 7 for lading discharge through the openings between bottom edges 126 and 136. Each of the body sections are provided with dump wheels 152 and 153 for unloading the respective compartments 94 and 96 in sequence as transversely spaced ramps 154 and 155 are traversed. In many applications this arrangement has the advantage of requiring less energy than if one large compartment extending the length of the car were utilized. The cars do not have to be going at such a rapid speed at the unloading station when a two compartment car is utilized to lift the lading weight body sections as when a single very heavy loaded compartment is used. Thus in the application where the cars are propelled by engines to assume the unloading position, the embodiment shown in FIGS. 6 and 7 would result in a savings of fuel and/or energy over a single compartment design such as FIGS. 1-3.

Figure 8:
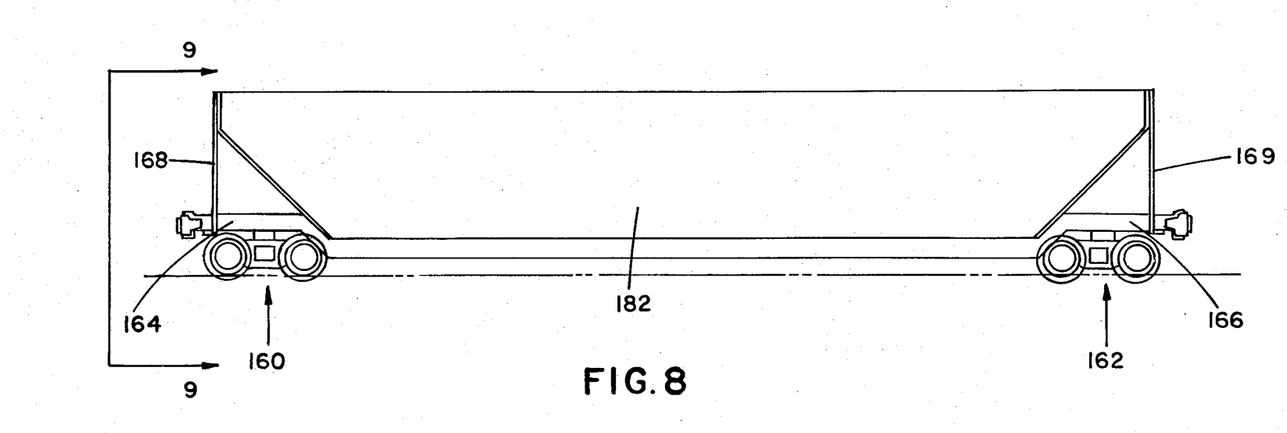
FIG. 8 is a side elevation view of an eight wheel car design of the present invention.
Figure 9:
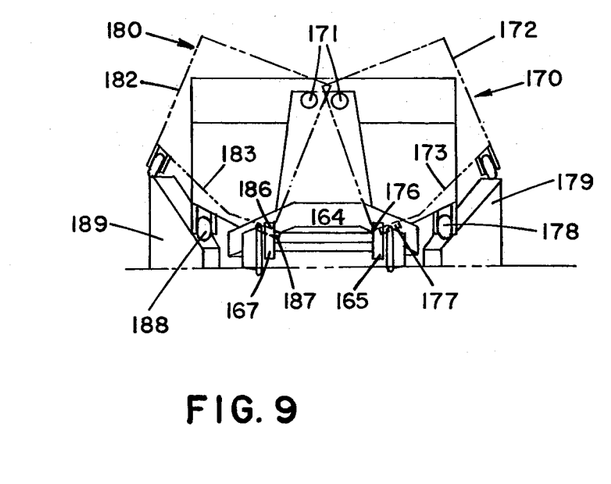
FIG. 9 is an end view of the car illustrated in FIG. 8 with the draft gear and coupler removed for clarity.

FIGS. 8 and 9 illustrate another embodiment in which an open top railway hopper car includes conventional trucks 160 and 162 located at opposite ends of the car. The trucks support respective body bolsters 164 and 166. Sills 165 and 167 extend the length of the car. Vertical support plates 168 and 169 are attached to the respective body bolsters. Body sections 170 and 180 are pivotally mounted about vertical supports 168, 169 by means of pins 171 attached to each vertical plate. Each body section includes side walls 172, 182 and horizontal bottom wall 173, 183, each having inner ends 176, 186 and stiffeners 177, 187 which are movable to the spaced position shown in dotted lines in FIG. 9 for discharge of the lading. Dump wheels 178, 188 are provided for each body section movable along the ramps 179, 189 to assume an open position. It is thus apparent that this eight (8) wheel car design is structurally similar and operates the same as the four (4) wheel car design shown in FIGS. 1–3 and described above.

If desired the eight (8) wheel design shown in FIGS. 8 and 9 may be constructed having longitudinally spaced compartments similar to compartments 94 and 96 illustrated in FIG. 6. An additional vertical support plate (not shown) is provided, attached between the side sills upon which the longitudinally spaced body sections are mounted, as shown in FIGS. 6 and 7 and described above.

Figures 10, 11, 12:
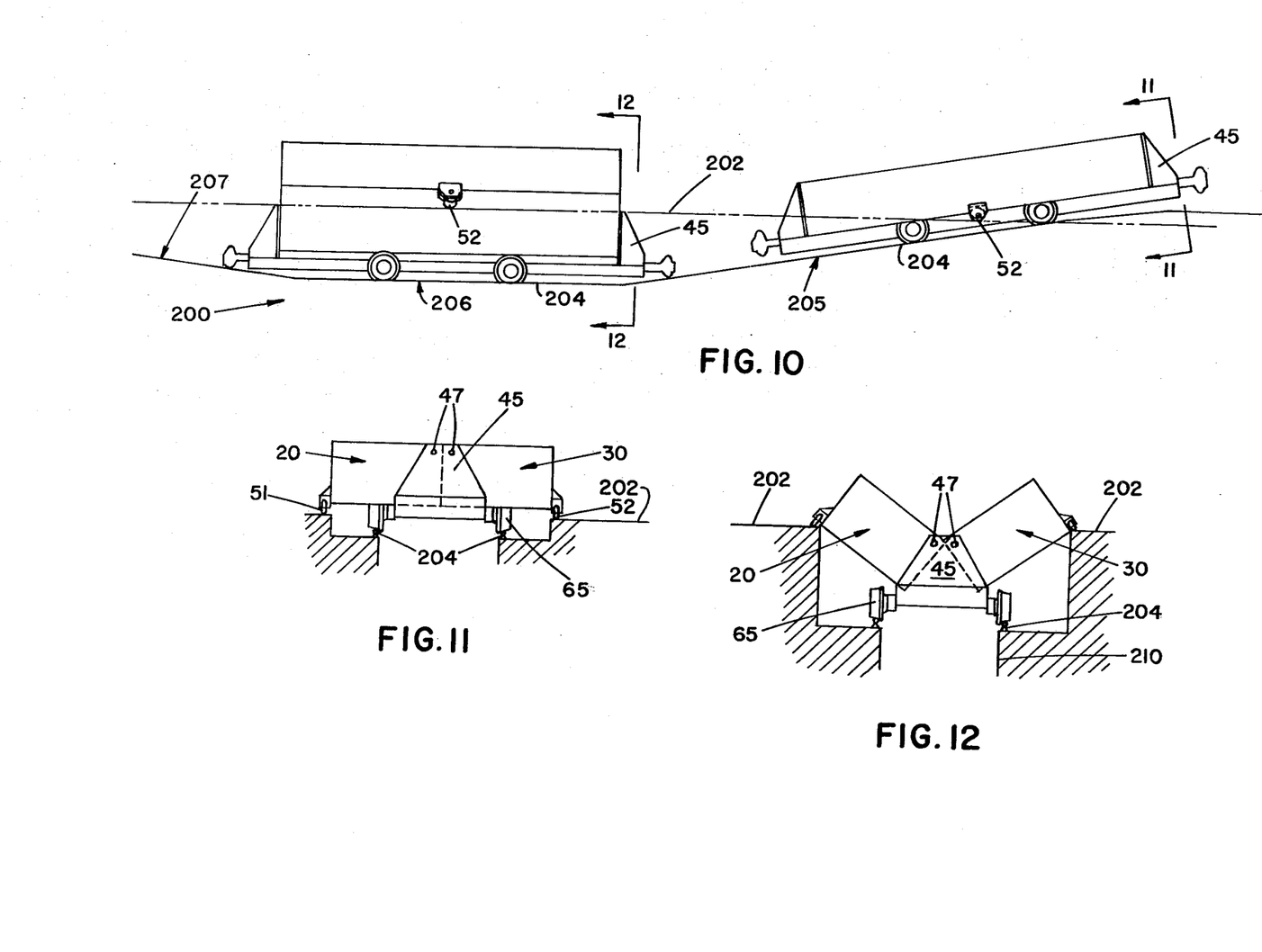
FIG. 10 is a side elevation view of an unloading arrangement for the bottom dump car of the present invention which requires a minimum amount of energy for unloading.
FIG. 11 is an end view looking in the direction of the arrows along the line 11—11 in FIG. 10.
FIG. 12 is an end view looking in the direction of the arrows along the lines 12—12 in FIG. 10.

In FIGS. 10–12 an energy saving unloading station is illustrated. This unloading station 200 includes a generally horizontal dump wheel track or surface 202 which wheels 51 and 52 follow in a generally horizontal path. A railroad track 204 is inclined downwardly within the first portion 205 of the unloading station. Thus body sections 20 and 30 move from the closed position in FIG. 11 to the open position shown in FIG. 12 as the underframe 40 and wheels 65 move downwardly following the track 204. At the mid portion 206 of the unloading station track 204 is generally horizontal. The track includes an upwardly inclined portion 207 during which the underframe moves upwardly relative to body section 20 and 30 until the closed position shown in FIG. 11 is again reached.

With this unloading arrangement the energy needed for unloading the lading is provided by gravity as the car moves down the inclined portion 205. No lifting of the lading or lifting of body sections 20 and 30 is required. In the full open position shown in FIG. 11, the lading is unloaded into a lading receiving opening 210.

The other embodiments of the invention also may be unloaded with this energy saving unloading arrangement.

What is claimed is:

1. An open top, bottom dump railway car comprising: a car body divided longitudinally into at least two transversely spaced car body sections; said car body sections including respective transversely spaced side walls, at least one end wall and bottom walls having inner edges abutting in closed position to define the bottom of the car; said side walls and bottom walls making at least a right angle; each said end wall pivotally mounted on a vertically extending support supported by a rail car underframe; said body sections extending outboard of the wheels; said bottom walls located below the top of said wheels in closed position; well means in said bottom walls to allow said wheels to extend above said bottom walls; the entire volume of said body sections located outboard of said wheels available for lading carrying capacity; each of said body sections pivotable from the closed position to an open position in which the inner edges of said bottom walls are spaced apart to allow discharge of lading.

2. An open top, bottom dump railway car according to claim 1 wherein said body sections include end walls located on both ends of said side walls ad bottom walls.

3. An open top, bottom dump railway car according to claim 1 wherein longitudinal stiffeners are mounted on each of said bottom walls adjacent the inner edges of the bottom walls.

4. An open top, bottom dump railway car according to claim 1 therein said underframe includes transversely spaced side sills and longitudinally spaced end sills attached to said side sills.

5. An open top, bottom dump railway car according to claim 4 wherein side sills are located outboard of the wheels to increase the transverse unloading opening when said body sections are in the open position.

6. An open top, bottom dump railway car according to claim 1 in which said body sections include activating devices to move said body sections to the open position.

7. An open top, bottom dump railway car according to claim 6 wherein said activating devices include cam means mounted on the body sections to obtain engagement with an adjacent ramp.

8. An open top, bottom dump railway car according to claim 1 wherein said bottom is located close to the rail and includes openings in the bottom where the wheels are located, and contoured plates are attached to said bottom above the wheels.

9. An open top, bottom dump railway car according to claim 8 wherein said railway car is a mine car.

10. An open top, bottom dump railway car according to claim 1 wherein said bottom walls are generally horizontal and said body sections extend outboard of the wheels to achieve increased volumetric carrying capacity.

11. An open top, bottom dump railway car according to claim 1 wherein two of said vertically extending supports are attached to said underframe at opposite ends of the car, and a third vertically extending support is attached to said underframe at about the midpoint of the car.

12. An open top, bottom dump railway car comprising: at least two vertically extending end supports located generally at opposite ends of the car and supported by a car underframe; said underframe supported by rail car wheels; at least one vertically extending middle support located between said end supports and supported by said car underframe; a car body divided longitudinally to define at least two compartments; each of said compartments being pivotally mounted about at least one of said end and middle supports; each of said compartments divided transversely into at least two body sections; said body sections including respective transversely spaced side walls at least one end wall; said side walls and bottom walls making at least a right angle; and bottom walls having inner edges which abut in closed position to define the bottom of the car; in closed position said bottom walls located below the top of said wheels in closed position; well means in said bottom walls to allow said wheels to extend above said bottom walls; each of said end walls pivotally mounted on one of said vertically extending supports; each of said body sections pivotable from the closed position to an open position in which the inner edges of the bottom walls are spaced apart to allow discharge of lading.

13. An open top, bottom dump railway car according to claim 12 wherein said underframe includes transversely spaced side sills and longitudinally spaced end sills attached to said side sills.

14. An open top, bottom dump railway car comprising: a car body divided longitudinally to define at least two compartments; at least three vertically extending supports supported by a car underframe; said underframe supported by railway wheels; each of said compartments divided transversely into at least two body sections; said body sections including respective transversely spaced side walls, at least one end wall, and bottom walls having inner edges which abut in closed position to define the bottom of the car; said bottom walls in closed position located below the top of such wheels; well means in said bottom walls to allow said wheels to extend above said bottom walls; said side walls and bottom walls making at least a right angle; each of said end walls pivotally mounted on one of said vertically extending supports; said body sections extending outboard of the wheels; the entire volume of said body sections located outboard of said wheels being available for lading carrying capacity; each of said body sections pivotable from the closed position to an open position in which the inner edges of said bottom walls are spaced apart to allow discharge of lading.

15. An open top, bottom dump railway car according to claim 14 wherein said car includes longitudinally spaced trucks supporting said car, said trucks having four wheels each.

* * * * *

UNITED STATES PATENT AND TRADEMARK OFFICE
CERTIFICATE OF CORRECTION

PATENT NO. : 4,289,078
DATED : September 15, 1981
INVENTOR(S) : Robert S. Anderson It is certified that error appears in the above–identified patent and that said Letters Patent are hereby corrected as shown below:

In colunn 3, line 20, please change "abutt" to --abut--.
In column 3, line 50, please change "discharge" to --discharged--.
In column 4, line 21, please change "29" to --20--.
In column 5, line 15, please change "chuncks" to --chunks--.
In column 6, line 66, please change "therein" to --wherein--.

Signed and Sealed this

Sixth Day of July 1982

[SEAL]

Attest:

GERALD J. MOSSINGHOFF

Attesting Officer

Commissioner of Patents and Trademarks